US010505224B2

(12) United States Patent
Yeh et al.

(10) Patent No.: US 10,505,224 B2
(45) Date of Patent: Dec. 10, 2019

(54) ELECTROLYTE, COMPOSITION FOR ELECTROLYTE AND LITHIUM BATTERY EMPLOYING THE SAME

(71) Applicant: INDUSTRIAL TECHNOLOGY RESEARCH INSTITUTE, Hsinchu (TW)

(72) Inventors: Ting-Ju Yeh, Taipei (TW); Chia-Ming Chang, Hsinchu (TW); Tsung-Hsiung Wang, Dali (TW); Cheng-Zhang Lu, Zhudong Township (TW); Chia-Erh Liu, Zhudong Township (TW); Shih-Chieh Liao, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 105 days.

(21) Appl. No.: 15/857,338

(22) Filed: Dec. 28, 2017

(65) Prior Publication Data

US 2019/0207255 A1 Jul. 4, 2019

(51) Int. Cl.
*H01M 10/0565* (2010.01)
*H01M 10/056* (2010.01)
*H01M 10/0525* (2010.01)
*H01M 4/505* (2010.01)
*H01M 4/525* (2010.01)
*H01M 4/485* (2010.01)

(52) U.S. Cl.
CPC ....... *H01M 10/0565* (2013.01); *H01M 4/485* (2013.01); *H01M 4/505* (2013.01); *H01M 4/525* (2013.01); *H01M 10/056* (2013.01); *H01M 10/0525* (2013.01); *H01M 2300/0085* (2013.01)

(58) Field of Classification Search
CPC ......... H01M 10/0565; H01M 10/0525; H01M 10/056; H01M 2300/0085
See application file for complete search history.

(56) References Cited

U.S. PATENT DOCUMENTS

| 5,965,300 A | * | 10/1999 | Lee ................... H01M 10/0565 |
| | | | 429/314 |
| 6,511,769 B1 | | 1/2003 | Jung et al. |
| 6,749,962 B2 | | 6/2004 | Noh |
| 2015/0072244 A1 | | 3/2015 | Chen et al. |

(Continued)

FOREIGN PATENT DOCUMENTS

| CN | 101606269 A | 12/2009 |
| CN | 101517809 B | 5/2012 |
| CN | 103474697 A | 12/2013 |

(Continued)

OTHER PUBLICATIONS

Taiwanese Office Action and Search Report for Taiwanese Application No. 106146229, dated May 31, 2018.

*Primary Examiner* — Stewart A Fraser
(74) *Attorney, Agent, or Firm* — Birch, Stewart, Kolasch & Birch, LLP

(57) ABSTRACT

An electrolyte is provided. The electrolyte includes a polymer, a lithium salt, and an organic solvent. The polymer is a polymerization product of a reactive additive and an initiator, wherein the reactive additive includes at least an amide group and at least an epoxy group or ethyl group. A composition for electrolyte and a lithium battery employing the electrolyte are also provided.

19 Claims, 3 Drawing Sheets

(56) References Cited

U.S. PATENT DOCUMENTS

2017/0301950 A1* 10/2017 Mimura .................. H01B 1/08

FOREIGN PATENT DOCUMENTS

| CN | 106654362 A | 5/2017 |
| CN | 106797053 A | 5/2017 |
| KR | 10-2016-0040113 A | 4/2016 |
| TW | I351121 B | 10/2011 |

* cited by examiner

ELECTROLYTE, COMPOSITION FOR ELECTROLYTE AND LITHIUM BATTERY EMPLOYING THE SAME

TECHNICAL FIELD

The present disclosure relates to an electrolyte and a lithium battery employing the same.

BACKGROUND

Solid state electrolyte can be divided into organic, inorganic, organic-inorganic composite electrolytes. However, the conductivity of organic polymer solid state electrolyte (for example, PEO, PAN) is low ($<10^{-5}$ S/cm). Although the inorganic solid state electrolyte (for example, LLZO, LLTO, LAGP) has high conductivity (about $10^{-3}$ S/cm), the interface resistance between the inorganic solid state electrolyte and the electrode is high. In addition, the traditional inorganic ceramic electrolyte is very brittle and has poor film-forming ability and poor mechanical properties and cannot be continuously processed. Although organic-inorganic composite electrolyte can decreases the interface resistance, the conductivity is decreased due to the addition of the organic polymer.

Therefore, a quasi-solid state electrolyte (QSSE) is derived as a fourth type of solid state electrolyte. That is, in addition to the organic-inorganic composite electrolyte, a small amount of liquid electrolyte (<5 wt %) is added to increase ionic conductivity.

However, the presence of liquid electrolytes may cause problems such as liquid leakage, flammable, poor cycle life, gassing, not resistant to high temperature. Also, the problem of high interface resistance of solid state electrolytes still exists. Therefore, a novel electrolyte is currently needed to solve the above shortcomings.

SUMMARY

An embodiment of the present disclosure provides an electrolyte, including a polymer, which is a polymerization product of a reactive additive and an initiator, wherein the reactive additive comprises at least one amide group and at least one epoxy group or vinyl group; a lithium salt; and an organic solvent.

Another embodiment of the present disclosure provides a composition for electrolyte, including a first solution which includes a reactive additive and a first organic solvent, wherein the reactive additive includes at least one amide group and at least one epoxy group or vinyl group; and a second solution which includes an initiator, a lithium salt, and a second organic solvent, wherein the first solution and the second solution are stored separately before the first solution and the second solution are mixed to form the electrolyte.

Another embodiment of the present disclosure provides a lithium battery, including a positive electrode; a negative electrode; and an ion conductive layer, disposed between the positive electrode and the negative electrode, wherein the ion conductive layer includes the aforementioned electrolyte.

A detailed description is given in the following embodiments with reference to the accompanying drawings.

BRIEF DESCRIPTION OF DRAWINGS

The present disclosure can be more fully understood by reading the subsequent detailed description and examples with references made to the accompanying drawings, wherein.

DETAILED DESCRIPTION

Figure 1:
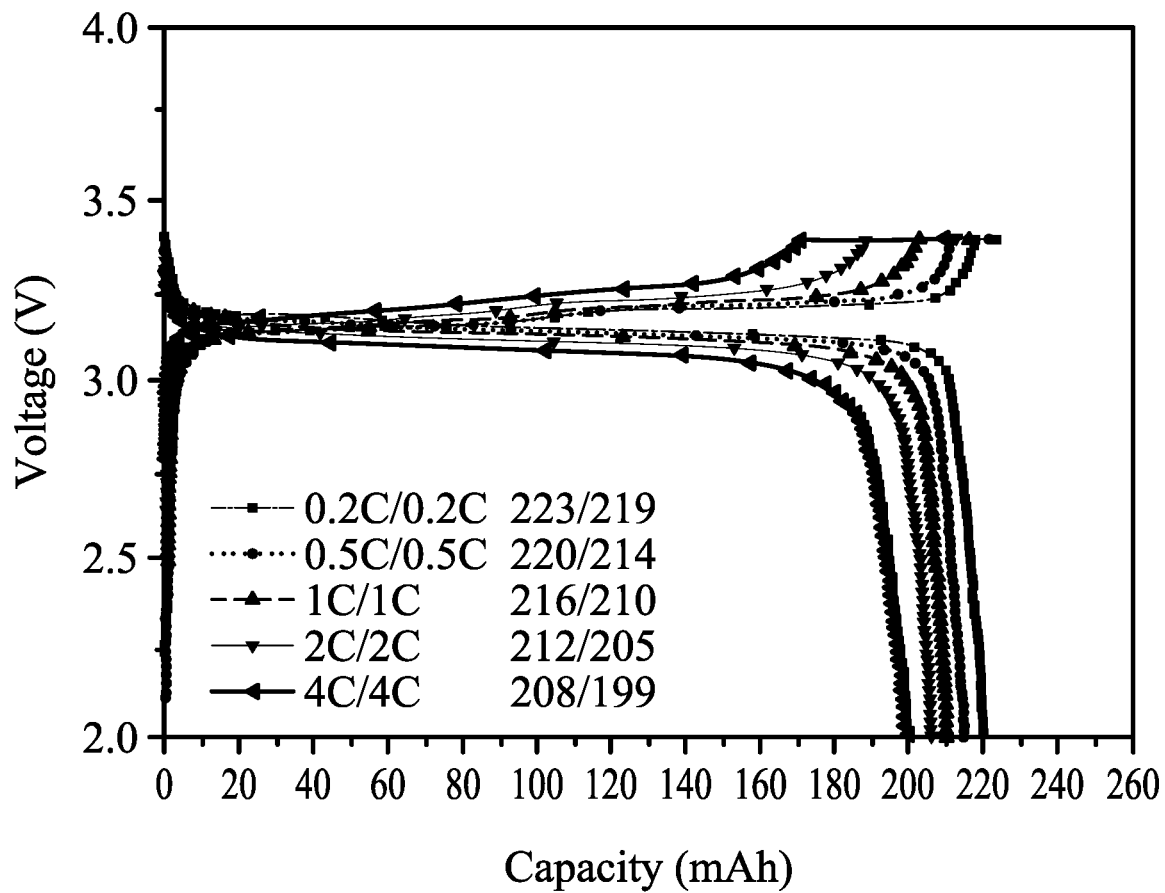
FIG. 1 illustrates the result of a rate charge-discharge test for batteries using the liquid electrolyte formed in Comparative Example 1.

As used herein, the singular forms "a," "an" and "the" are intended to include the plural forms as well, unless the context clearly indicates otherwise. It will be further understood that the terms "comprises" and/or "comprising,"-when used in this specification, specify the presence of stated features, steps, operations, elements, and/or components, but do not preclude the presence or addition of one or more other features, steps, operations, elements, components, and/or groups thereof.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The embodiments of the present disclosure provide an electrolyte with non-flammable property and there is no concern of liquid leakage. In addition, since the electrolyte provided by the present disclosure has good coating property for both of the positive electrode and the negative electrode, the interface resistance between the electrolyte and the positive electrode or the negative electrode can be effectively reduced, and thus the electrolyte can be used as an ion conductive layer.

An embodiment of the present disclosure provides an electrolyte, including a polymer, a lithium salt, and an organic solvent. The polymer is a polymerization product of a reactive additive and an initiator. The reactive additive includes at least one amide group and at least one epoxy group or vinyl group.

In some embodiments, the reactive additive has a linear structure represented by formula (I) or includes a cyclic structure shown by formula (II):

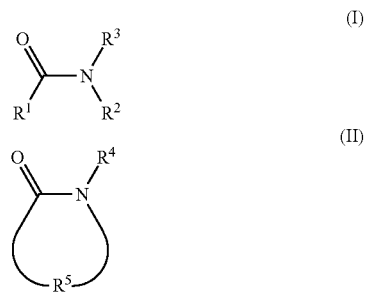

Each of $R^1$ and $R^2$ is independently unsubstituted or substituted epoxy group, amino group, alkyl amino group, alkyl group, alkoxy group, alkenyl group, alkenyloxy group, ether group, ester group, aryl group, or haloalkyl group; $R^3$ is unsubstituted or substituted epoxy group, amino group, alkyl amino group, alkyl group, alkoxy group, alkenyl group, alkenyloxy group, ether group, ester group, aryl group, haloalkyl group, or the above unsubstituted or substituted groups comprising 1-9 repeat units of amide group; and at least one of $R^1$, $R^2$, and $R^3$ includes an epoxy group or a vinyl group. The epoxy group or vinyl group may provide the progress of polymerization reaction. In one embodiment, the linear structure having formula (I) may be, for example:

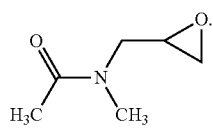

In one embodiment, when $R^3$ includes 1 repeat group of amide group, the linear structure having formula (I) may be, for example:

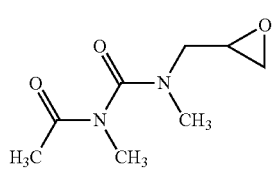

In some embodiments, the cyclic structure shown by formula (II) may be, for example, a 4-20 multiple-ring of unsubstituted or substituted cycloalkane, aromatic hydrocarbon, aromatic ring, heterocyclic ring, or a cyclic structure composed of plurality repeat units of amide group

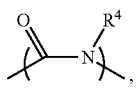

wherein $R^4$ may be a group including at least one epoxy group or vinyl group, $R^5$ may be —$(CH_2)_n$— (n is an integer between 1 and 18), —$(CH_2)_n$— with one or more —$CH_2$— substituted by —$NR^4$— (n is an integer between 1 and 18), or 1-9 repeat units of amide group

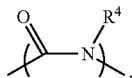

For example, in some embodiments, the cyclic structure having formula (II) may be, for example:

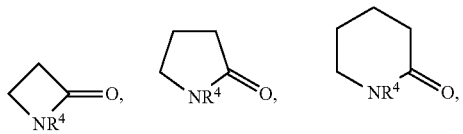

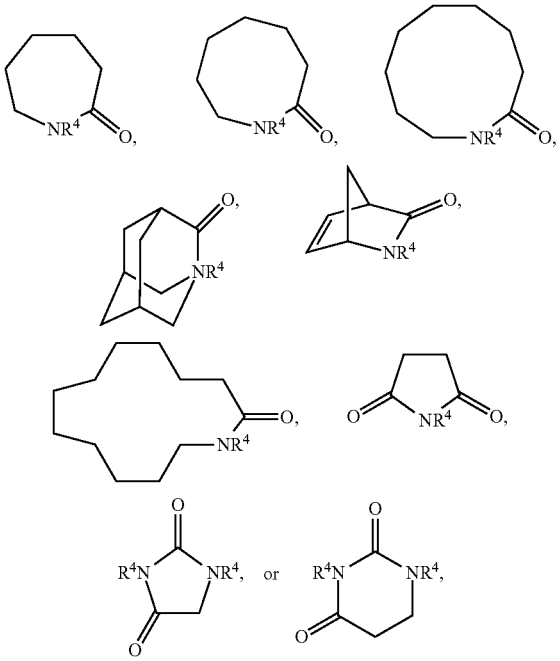

etc., but is not limited thereto.

In some other embodiments, the reactive additive has a cyclic structure composed of 1-10 repeat units of amide group

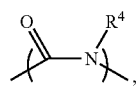

for example:

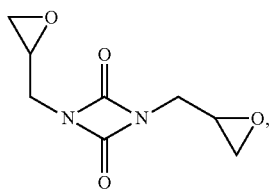

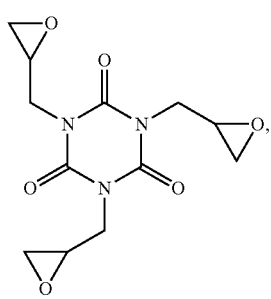

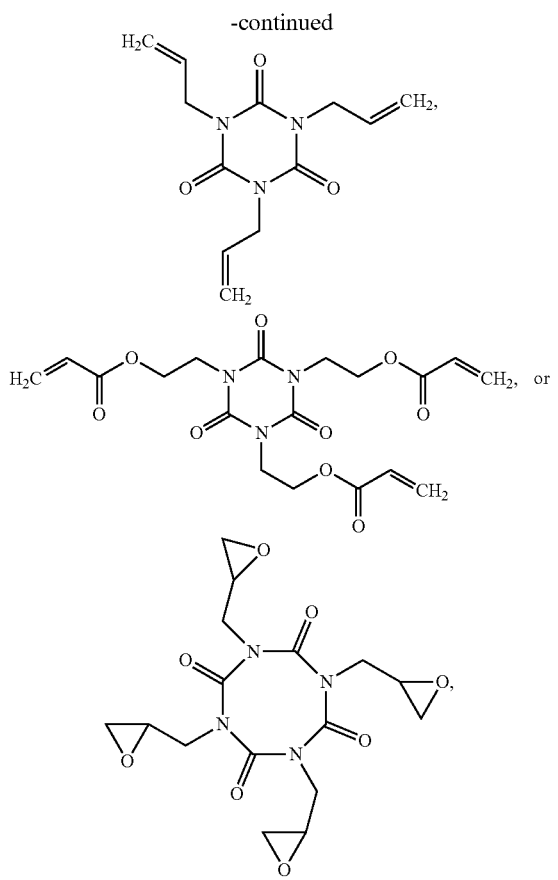

etc., but is not limited thereto.

It should be realized that the aforementioned reactive compounds are only examples and are not intended to limit the present disclosure.

It is worth mention that, by adding a reactive additive having at least one amide group and at least one epoxy group or vinyl group and by controlling the ratio among the reactive additive, initiator, lithium salt, and organic solvent, the electrolyte of the present disclosure is changed from a liquid state to a colloidal state or a quasi-solid state after undergoing the polymerization reaction with the reactive additive.

Specifically, since the amide group of the reactive additive has negative field effect, and there are unshared electron pair on the carbonyl group of organic solvent (such as common used carbonic ester solvent, for example, propylene carbonate (PC), ethylene carbonate (EC), dimethyl carbonate (DMC)) used in the liquid electrolyte, both of amide group and carbonyl group tend to attract the positive-charged lithium ions and chelate the lithium ions together. When several reactive additives having amide group are attracted to each other through the lithium ions, the fluidity of organic solvent molecules is decreased, and thus the viscosity of the electrolyte is enhanced. In addition, because the reactive additive having amide group also has epoxy group or vinyl group, while the epoxy group can undergo a ring-opening polymerization reaction and the vinyl group can undergo a free-radical polymerization reaction through the initiator, the viscosity of electrolyte is further enhanced and the electrolyte is changed from a liquid state to a colloidal state or a quasi-solid state.

In some embodiments, the weight percentage of the reactive additive may be, for example, 5 wt %-50 wt %, based on the total weight of the electrolyte. For example, in some embodiments, the weight percentage of the reactive additive may be, for example, 8 wt %, 10 wt %, 20 wt %, or 50 wt %, based on the total weight of the electrolyte. By controlling the additive amount of reactive additive, the fluidity of the electrolyte can be controlled. If the amount of reactive additive is too small, the viscosity of the electrolyte cannot be enhanced, and the liquid electrolyte cannot be cured to become a quasi-solid state electrolyte. If the amount of reactive additive is too high, the viscosity of the electrolyte becomes too high, and the ion conductivity becomes poor and the performance of batteries will be affected.

In some embodiments, the initiator may include ionic compounds capable of dissociating to produce nucleophilic groups, peroxides or azo compounds capable of producing free radicals, or primary amine compounds. In some embodiments, the stated ion compounds may include $CH_3COOLi$, $LiOH$, $LiBF_4$, $LiPF_6$, $LiClO_4$, $LiTFSI$, $LiFSI$, $LiAsF_6$, $LiSbF_6$, or a combination thereof. In the present disclosure, the initiator may be used to let the epoxy group or vinyl group of reactive additive to undergo the polymerization reaction, enhancing the molecular weight and the viscosity of the electrolyte.

In some embodiments, the weight percentage of the initiator may be, for example, 0.5 wt %-15 wt %, based on the total weight of the electrolyte. If the amount of initiator is too small, the reaction rate of the polymerization reaction is slow, and it is difficult to react completely and excess monomer reactant would be remained, and thus the liquid electrolyte cannot be cured to become a quasi-solid state electrolyte. If the amount of initiator is too high, the reaction rate of polymerization is too fast, the molecular chain is short, and it is not easy to form a polymer with high molecular weight, and thus it is not easy for the electrolyte to be cured and the electrolyte would have poor mechanical properties.

In some embodiments, the stated lithium salt may include $LiBF_4$, $LiPF_6$, $LiClO_4$, $LiTFSI$, $LiAsF_6$, $LiSbF_6$, or other ionic compounds capable of dissociating lithium ions ($Li^+$).

In some embodiments, the molar concentration of the lithium salt in the electrolyte may be, for example, 0.8 M-6 M. In some embodiments, the weight percentage of the lithium salt may be, for example, 5 wt %-50 wt %, based on the total weight of the electrolyte. If the amount of lithium salt is too small, the dissociation number of anion and cation is too small and the ion conductivity is poor. If the amount of lithium salt is too high, the viscosity of the electrolyte is enhanced and the ionic conductivity is also poor.

It should be noted that, in some embodiments, the initiator may be the same as the lithium salt. In other words, when the used lithium salt is also capable of dissociating nucleophilic groups, such lithium salt may also play a role of initiator to undergo the anionic polymerization reaction. Therefore, in these embodiments, it simply needs to add lithium salts without adding other initiators. In some other embodiments, the initiator may be different from the lithium salt. The kind of the initiator depends on the functional group of the reactive additive. If the reactive additive has a vinyl group, peroxides or azo compounds are used as the initiator to undergo the free radical polymerization reaction. If the reactive additive has an epoxy group, primary amino compounds or ionic compounds may be used as the initiator.

According to different kinds and amounts of the initiator (or lithium salts that can be used as initiator), the reaction rate and reaction temperature of the polymerization reaction are different. For example, when $LiBF_4$ is selected to be used as the lithium salt, $LiBF_4$ may play a role of initiator at the same time. The polymerization reaction may be completed at room temperature (about 25-28° C.) after about 12-24 hours without heating or providing additional energy. When $LiPF_6$ is selected to be used as the lithium salt, although $LiPF_6$ may also play a role of initiator, the polymerization reaction needs to be completed at about 90-100° C. after about 5-10 minutes. When $LiClO_4$, LiTFSI, etc. are selected to be used as the lithium salt, although $LiClO_4$ and LiTFSI may also play a role of the initiator, the polymerization reaction needs to be completed at about 170-180° C. after about 120 minutes.

However, it should be noted that initiators are applicable to the embodiments of the present disclosure as long as the stated initiator (or lithium salts that that can be used as initiator) is capable of providing adequate polymerization reaction rate and sufficient polymerization reaction time, so that the electrolyte can be injected to and permeated the battery in a liquid state before the electrolyte is cured, after that, the polymerization reaction is completed and a colloidal state or a quasi-solid state electrolyte is formed by interfering the fluidity of the solvent through the coordination force formed by the lithium ion and the solvent. The technical advantages of the present disclosure are that when the electrolyte is in a liquid state, the electrolyte can be sufficiently permeated to each corner of the battery to reduce the interface resistance between the electrolyte and the positive electrode or the negative electrode. When the electrolyte is cured and enters a colloidal state or a quasi-solid state, there is no liquid leakage from the battery. Also, the colloidal state or solid-state electrolyte formed after curing has a higher flash point than the commercial liquid electrolyte several times, and thus are not flammable, and thus the safety of lithium batteries is significantly improved. Therefore, the electrolyte provided by the present disclosure can effectively reduce the interface resistance and improve the safety of the lithium battery.

In some embodiments, the weight percentage of the organic solvent may be, for example, 40 wt %-80 wt %, based on the total weight of the electrolyte.

In some embodiments, the stated organic solvent may include commonly used solvents for general liquid electrolyte, for example, carbonates, sulfonates, nitriles, ethers, esters, fluorides, or other aprotic solvents with high polarity.

In some embodiments, carbonate can be divided into cyclic carbonate compounds and linear carbonate compounds. The cyclic carbonate compounds may include ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate, or a combination thereof, but is not limited thereto. The linear carbonate compounds may include dimethyl carbonate (DMC), diethyl carbonate (DEC), dipropyl carbonate, ethyl methyl carbonate (EMC), methyl propyl carbonate, ethyl propyl carbonate, or a combination thereof, but is not limited thereto.

In some embodiments, ether may include dimethyl ether, diethyl ether, dipropyl ether, methyl ethyl ether, methyl propyl ether, ethyl propyl ether, or a combination thereof, but is not limited thereto.

In some embodiments, ester may include methyl acetate, ethyl acetate, propyl acetate, methyl propionate, ethyl propionate, γ-butyrolactone, γ-valerolactone, γ-caprolactone, σ-valerolactone, ε-caprolactone, or a combination thereof, but is not limited thereto.

In some embodiments, the electrolyte provided by the present disclosure further includes an inorganic electrolyte. In some embodiments, the inorganic ceramic electrolyte may include lithium lanthanum zirconium oxide (LLZO), tantalum doping lithium lanthanum zirconium oxide (LL-ZTO), lithium lanthanum titanium oxide (LLTO), lithium aluminum titanium phosphate (LATP), germanium aluminum titanium phosphate (LAGP), lithium germanium phosphorous sulfide (LGPS), or lithium tin phosphorous sulfide (LSPS). For example, the inorganic ceramic electrolyte may include $Li_7La_3Zr_2O_{12}$, $Li_{6.75}La_3Zr_{1.75}Ta_{0.25}O_{12}$, $Li_{0.33}La_{0.56}TiO_3$, $Li_{1.3}Al_{0.3}Ti_{1.7}(PO_4)_3$, $Li_{1.5}Al_{0.5}Ge_{1.5}(PO_4)_3$, $Li_{10}GeP_2S_{12}$, $Li_{10}SnP_2S_{12}$, $70Li_2S.30P_2S_5$, or other combinations with the same elements but different stoichiometric quantities. In one embodiment of the present disclosure, the organic-inorganic electrolyte formed by blending the electrolyte and the inorganic electrolyte not only has flexibility but also has good conductivity.

In another embodiment of the present disclosure, a composition for electrolyte is also provided, including a first solution and a second solution. The first solution includes a reactive additive and a first organic solvent, wherein the reactive additive includes at least one amide group and at least one epoxy group or vinyl group. The second solution includes an initiator, a lithium salt, and a second organic solvent. Regarding the reactive additive, initiator, lithium salt, and organic solvent, reference may be made to the description of the previous related paragraphs in the specification. In some embodiments, the first organic solvent and the second organic solvent may be the same or different.

After mixing the first solution and the second solution, the reactive additive in the first solution and the initiator or the lithium salt in the second solution begin to undergo a polymerization reaction to form the electrolyte. It should be noted that, the first solution and the second solution are stored separately before the first solution and the second solution are mixed to form the electrolyte.

In some embodiments, the weight percentage of the reactive additive in the first solution may be, for example, 5 wt %-50 wt %, based on the total weight of the first solution and the second solution. For example, in some embodiments, the weight percentage of the reactive additive may be, for example, 8 wt %, 10 wt %, 20 wt %, or 50 wt %, based on the total weight of the first solution and the second solution.

In some embodiments, the weight percentage of the initiator in the second solution may be, for example, 0.5 wt %-15 wt %, based on the total weight of the first solution and the second solution.

In some embodiments, in the mixed solution of the first solution and the second solution, the molar concentration of the lithium salt may be, for example, 0.8 M-6 M. In some embodiments, the lithium salt in the second solution may be, for example, 5 wt %-50 wt %, based on the total weight of the first solution and the second solution.

In some embodiments, based on the total weight of the first solution and the second solution, the total weight percentage of the first organic solvent and the second organic solvent may be, for example, 40 wt %-80 wt %.

In another embodiment of the present disclosure, a lithium battery is also provided. The lithium battery includes a positive electrode, a negative electrode, and an ion conductive layer disposed between the positive electrode and the negative electrode. The ion conductive layer includes the electrolyte aforementioned. In some embodiments, the material of the positive electrode may include lithium nickel manganese oxide ($LiNi_aMn_{2-a}O_4$, $0<a<2$), lithium nickel manganese cobalt oxide (LiNi$_n$Mn$_m$Co$_{1-n-m}$O$_2$, 0<n<1, 0<m<1, n+m<1), lithium manganate (LiMn$_2$O$_4$), lithium iron phosphate (LiFePO$_4$), lithium manganese oxide (LiMnO$_2$), lithium cobalt oxide (LiCoO$_2$), lithium nickel cobalt oxide (LiNi$_p$Co$_{1-p}$O$_2$, 0<p<1), or lithium nickel manganese oxide (LiNi$_q$Mn$_{2-q}$O$_4$, 0<q<2). In some embodiments, the material of the negative electrode may include graphite, lithium titanium oxide (Li$_4$Ti$_5$O$_{12}$), or lithium. In one embodiment, the stated lithium battery further includes a separator.

In the embodiments of the present disclosure, by adding adequate ratio of the reactive compound having amide group and epoxy group or vinyl group, the liquid electrolyte may be cured to become a colloidal state or a quasi-solid state electrolyte without heating or providing additional energy. The colloidal state or quasi-solid state electrolytes formed in the embodiments of the present disclosure not only have flame-retardant properties without liquid leakage but also are capable of reducing the interface resistance between the electrolyte and the positive electrode or the negative electrode of the battery, so that the electrolyte can be used as an ion conductive layer. In addition, batteries using the colloidal state or quasi-solid state electrolyte provided by the present disclosure also have excellent rate charging-discharging characteristics and excellent cycle life performance at room temperature.

The various Comparative Examples and Embodiments are listed below to illustrate the quasi-solid state electrolyte, lithium battery provided by the present disclosure and the characteristics thereof.

COMPARATIVE EXAMPLE 1

EXAMPLES 1-4

Preparation of Electrolyte

LiBF$_4$ used as the initiator and LiPF$_6$ used as the lithium salt were dissolved in the organic solvent EC/DMC (v/v=1:2) to make the concentration of LiBF$_4$ in the organic solvent to be 0.5 M and the concentration of LiPF$_6$ in the organic solvent to be 1 M. Then, according to the weight and ratio shown in Table 1, the reactive additive having the following formula (II-1) was added to the aforementioned organic solvent containing the initiator of LiBF$_4$ and the lithium salt of LiPF$_6$. The mixture was mixed at room temperature and sufficiently stirred to form the electrolyte.

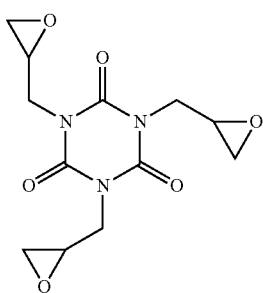

(II-1)

After the above mixture, the electrolyte formed in various Comparative Examples and Examples were liquid state at first. After standing at room temperature for about 12 hours, the morphology of the electrolytes formed in various Comparative Examples and Examples became different. As shown in Table 1, it reveals that the electrolyte of Example 1 changed to colloidal state, and the electrolytes of Examples 2-4 changed to quasi-solid state after reacting at room temperature for about 12 hours. In comparison, the electrolyte of Comparative Example 1 was still in a liquid state.

The results reveal that the present disclosure can successfully form a colloidal state or a quasi-solid state electrolyte and apply it to the battery system to avoid liquid leakage from batteries.

TABLE 1

| component species | reactive additive formula (II-1) | initiator LiBF$_4$ | lithium salt LiPF$_6$ | organic solvent EC/DMC | electrolyte morphology after reacting at room temperature |
|---|---|---|---|---|---|
| Comparative Example 1 | 0 wt % | | | 100 wt % | liquid state |
| Example 1 | 5 wt % | | | 95 wt % | colloidal state |
| Example 2 | 8 wt % | | | 92 wt % | quasi-solid state |
| Example 3 | 10 wt % | | | 90 wt % | quasi-solid state |
| Example 4 | 20 wt % | | | 80 wt % | quasi-solid state |

Self-extinguishing Time Test of Electrolyte

Then, the self-extinguishing time (SET) of each Comparative Example and Example was tested. According to the reference J. of Electrochem. Soc. 2002, 149, A6225, SET>20 represents flammable materials, 6<SET<20 represents flame-retardant materials, and SET<6 represents flame-resistant materials. The test results of the various Comparative Examples and Examples are shown in Table 2.

As can be seen from Table 2, as the amount of reactive compound in the electrolyte increases, the self-extinguishing time of the electrolyte decreases from 57 (sec/g) in Comparative Example to 0 (sec/g) in Examples 1-4. The colloidal state electrolyte formed in Example 1 and the quasi-solid state electrolyte formed in Examples 2-4 are all flame-resistant materials.

The results reveal that the electrolyte provided by the present disclosure has good safety since it contains reactive additives.

TABLE 2

| | content of the reactive additive | self-extinguishing time (sec/g) | material properties |
|---|---|---|---|
| Comparative Example 1 | 0 wt % | 57 | flammable |
| Example 1 | 5 wt % | 0 | flame-resistant |
| Example 2 | 8 wt % | 0 | flame-resistant |
| Example 3 | 10 wt % | 0 | flame-resistant |
| Example 4 | 20 wt % | 0 | flame-resistant |

Conductivity Test of Electrolyte

Then, the conductivity of the electrolyte formed in each Comparative Example and Example was tested. The results are shown in Table 3.

As can be seen from Table 3, although the conductivity decreases as the amount of reactive additive in the electrolyte increases, the ionic conductivity of Example 2 (quasi-solid state containing 8 wt % of reactive additive) is similar to the ionic conductivity of ceramic solid electrolyte (about $10^{-4}$ S/cm) and there is no shortcoming of interface resistance as existing in the solid state electrolyte. Also, the ionic conductivity of Example 2 is superior to the general polymer solid state electrolyte (such as PEO, PAN)(<$10^{-5}$ S/cm).

TABLE 3

| | amount of reactive additive | conductivity ($\sigma$; S/cm) |
|---|---|---|
| Comparative Example 1 | 0 wt % | $9.6 \times 10^{-3}$ |
| Example 1 | 5 wt % | $4.5 \times 10^{-3}$ |
| Example 2 | 8 wt % | $1.3 \times 10^{-4}$ |
| Example 3 | 10 wt % | $5.4 \times 10^{-5}$ |
| Example 4 | 20 wt % | $3.2 \times 10^{-6}$ |

Preparation of Battery

Lithium titanium oxide ($Li_4Ti_5O_{12}$; LTO) with a thickness of 80 μm was used as a negative electrode and lithium nickel manganese oxide ($LiNi_{0.5}Mn_{1.5}O_4$; LNMO) with a thickness of 65 μm was used as a positive electrode to assemble the battery. The mixed electrolytes of Comparative Example 1 and Example 4 were respectively injected to the assembled batteries. Then, the preparation of battery was completed after standing at room temperature for about 12 hours.

After the above reaction at room temperature, a thin-filmed quasi-solid state electrolyte layer with a thickness of only 15 μm was formed in the battery using Example 4 as the electrolyte. Thinner thickness of the electrolyte layer can effectively shorten the ion-conducting path and reducing the internal resistance of battery, improving the rate charging-discharging characteristics of battery, as shown in the following experimental results.

Rate Charge-discharge Characteristics of Batteries

Figure 2:
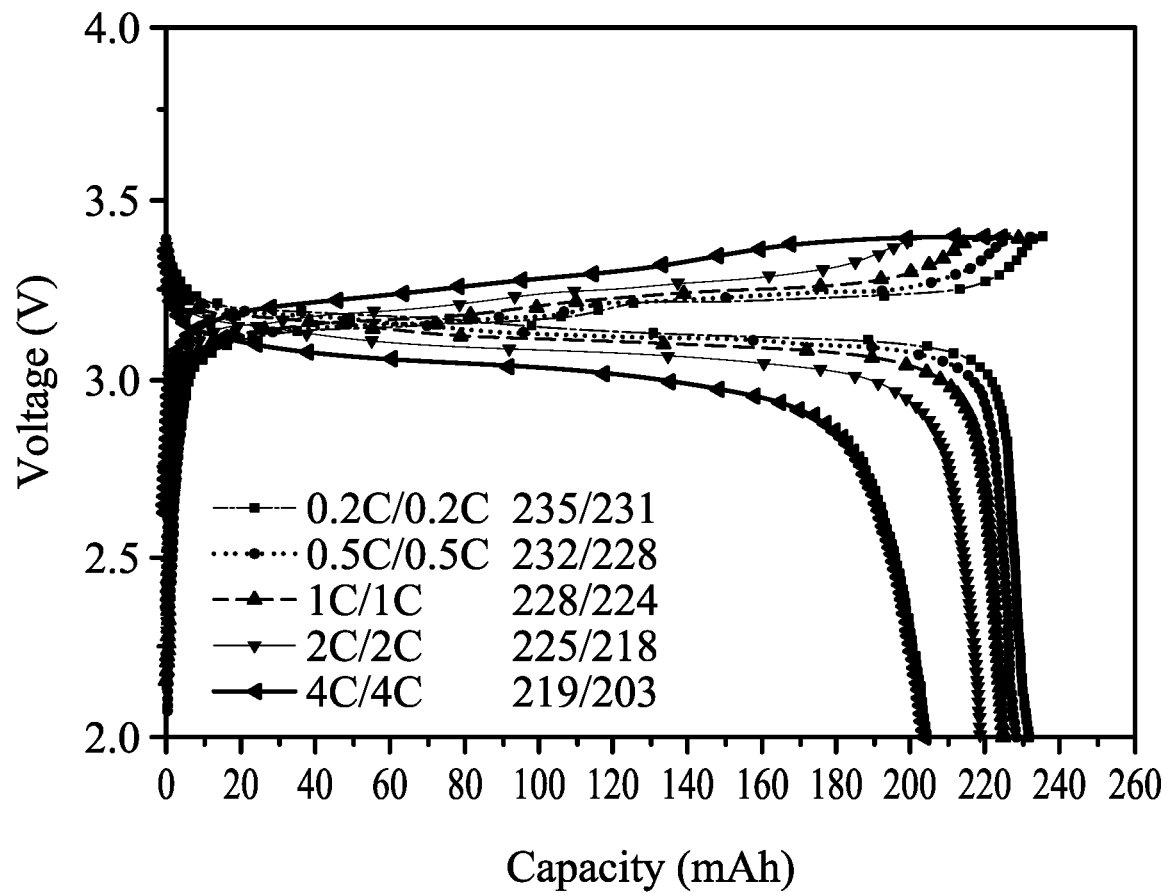
FIG. 2 illustrates the result of a rate charge-discharge test for batteries using the quasi-solid state electrolyte formed in Example 4.

The rate charge-discharge test for the above prepared batteries (with a battery capacity of 250 mAh) was conducted at room temperature. FIG. 1 illustrates the results of the rate charge-discharge test of the batteries using the liquid electrolyte formed in Comparative Example 1 as the electrolyte. FIG. 2 illustrates the results of the rate charge-discharge test of the batteries using the quasi-solid state electrolyte formed in Example 4 as the electrolyte.

As can be seen from FIGS. 1 and 2, the performances of the rate charge-discharge of the two batteries are similar, illustrating that the electrical performance of the quasi-solid state electrolyte is almost the same as the liquid electrolyte. However, the safety of the quasi-solid state electrolyte is significantly improved. As shown in the results of the self-extinguishing test, the quasi-solid state electrolyte formed in Example 4 has better safety than that of the liquid electrolyte formed in Comparative Example 1.

Cycle Life of Batteries

Figure 3:
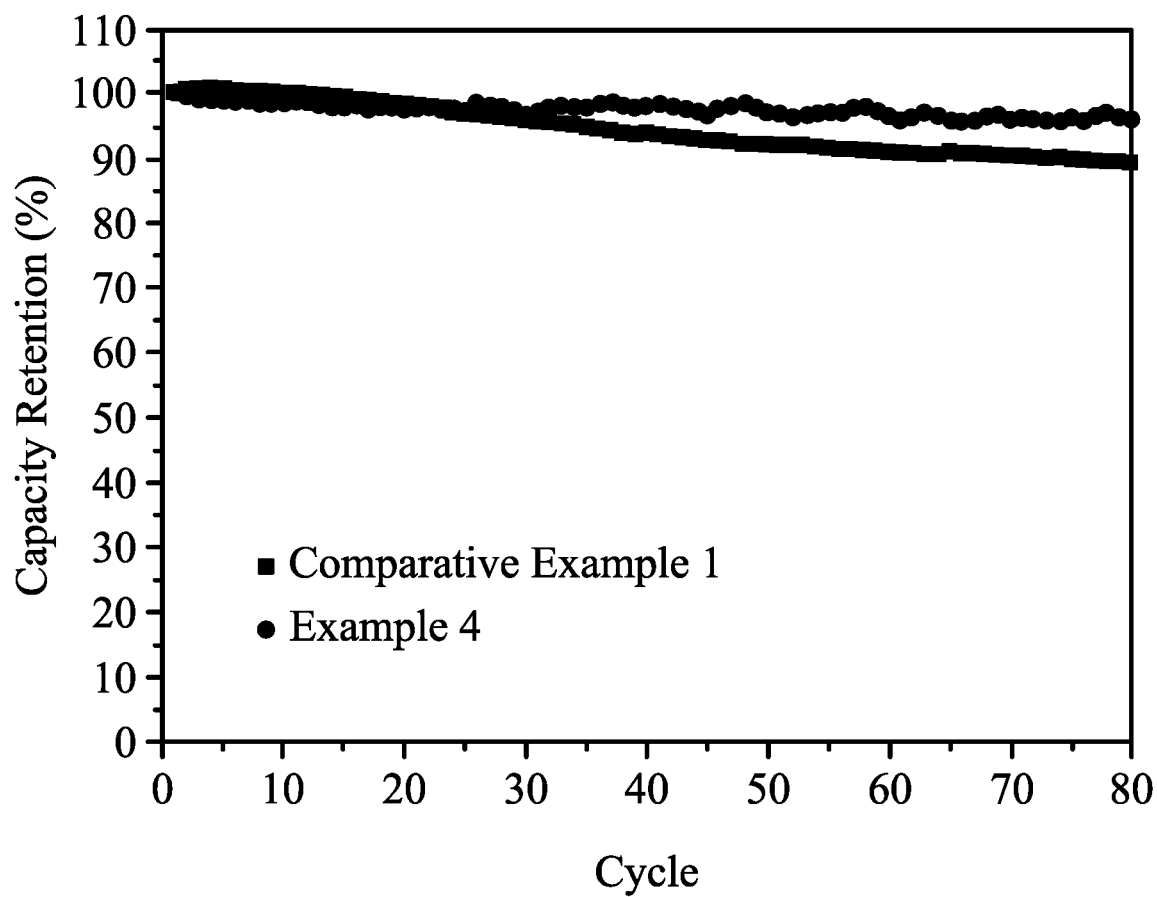
FIG. 3 illustrates the result of a cycle life test for batteries using the liquid electrolyte formed in Comparative Example 1 and the quasi-solid state electrolyte formed in Example 4.

The cycle life test of the above prepared batteries was conducted at room temperature. FIG. 3 illustrates the results of the cycle life test of the batteries using the liquid electrolyte formed in Comparative Example 1 as the electrolyte and the batteries using the quasi-solid state electrolyte formed in Example 4 as the electrolyte.

As can be seen from FIG. 3, when using the quasi-solid state electrolyte formed in Example 4, the capacity maintenance of the battery is better. In comparison, when using the liquid electrolyte formed in Comparison Example 1, the capacity decreases faster and the final capacity (after 80 cycles) is lower, the capacity maintenance is worse.

COMPARATIVE EXAMPLE 2

EXAMPLE 5

Preparation of Organic-inorganic Quasi-solid State Electrolyte

Inorganic ceramic material $Li_{1.6}Al_{0.6}Ge_{1.4}(PO_4)_3$ (LAGP) was used as the solid electrolyte in Comparative Example 2.

In Example 5, all of the components shown in Example 4 of Table 1 and the inorganic electrolyte $Li_{1.6}Al_{0.6}Ge_{1.4}(PO_4)_3$ (LAGP) were mixed in a weight ratio of 50/50 to form an organic-inorganic quasi-solid state electrolyte (LAGP/QSSE).

Conductivity Test of Organic-inorganic Quasi-solid State Electrolyte

The conductivity of the inorganic electrolyte and organic-inorganic quasi-solid state electrolyte respectively formed in Comparative Example 2 and Example 5 was further tested, and the results are shown in Table 4.

As can be seen from Table 4, the conductivity of the organic-inorganic quasi-solid state electrolyte LAGP/QSSE is close to $10^{-3}$ (S/cm) and is higher than the inorganic solid ceramic electrolytes of Comparative Example 2. In addition, as can be observed from the morphology that the organic-inorganic quasi-solid state electrolyte LAGP/QSSE formed by using the quasi-solid state electrolyte of Example 4 has flexibility.

TABLE 4

| | Constituent | | |
|---|---|---|---|
| | LAGP (wt %) | QSSE (wt %) | Conductivity ($\sigma$; S/cm) |
| Comparative Example 2 | 100 | 0 | $6.9 \times 10^{-4}$ |
| Example 5 | 50 | 50 | $8 \times 10^{-4}$ |

According to the results of various Comparative Examples and Examples, it is proved that the electrolyte provided by the present disclosure has flame-retardant properties without liquid leakage. Moreover, the shortcoming of interface resistance as existing between the electrolyte and the positive electrode or the negative electrode can be overcome. Thus, the electrolyte can be used as an ion conductive layer. In addition, batteries using the electrolyte provided by the present disclosure have excellent rate charge-discharge characteristics and excellent cycle life performance at room temperature. Furthermore, the organic-inorganic quasi-solid state electrolyte formed by mixing the electrolyte provided by the present disclosure and inorganic electrolytes also has excellent conductivity and flexibility.

While the present disclosure has been described by several preferred embodiments above, the present disclosure is not limited to the disclosed embodiments. Those skilled in the art may make various changes and modifications without departing from the spirit and scope of the present disclosure. Therefore, the protected scope of the present disclosure should be indicated by the following appended claims.

What is claimed is:

1. An electrolyte, comprising:
    a polymer, which is a polymerization product of a reactive additive and an initiator, wherein the reactive additive comprises at least one amide group and at least one epoxy group;
    a lithium salt; and
    an organic solvent.

2. The electrolyte as claimed in claim 1, wherein the reactive additive has a linear structure represented by formula (I) or comprises a cyclic structure shown by formula (II):

(I)

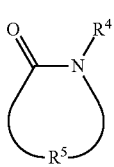

wherein each of R[1] and R[2] is independently unsubstituted or substituted epoxy group, amino group, alkyl amino group, alkyl group, alkoxy group, alkenyl group, alkenyloxy group, ether group, ester group, aryl group, or haloalkyl group; R[3] is unsubstituted or substituted epoxy group, amino group, alkyl amino group, alkyl group, alkoxy group, alkenyl group, alkenyloxy group, ether group, ester group, aryl group, haloalkyl group, or the above unsubstituted or substituted groups comprising 1-9 repeat units of amide group; and at least one of R[1], R[2], and R[3] is a group comprising an epoxy group, R[4] is a group comprising at least one epoxy group, R[5] is $-(CH_2)_n-$, $-(CH_2)_n-$ with one or more $-CH_2-$ substituted by $-NR^4-$, or 1-9 repeat units of amide group

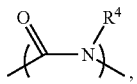

wherein n is an integer between 1 and 18.

3. The electrolyte as claimed in claim 1, wherein the reactive additive comprises a cyclic structure, the cyclic structure is a 4-20 multiple-ring of unsubstituted or substituted cycloalkane, aromatic hydrocarbon, aromatic ring, heterocyclic ring, or a cyclic structure composed of 1-10 repeat units of amide group

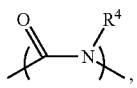

wherein R[4] is a group comprising at least one epoxy group.

4. The electrolyte as claimed in claim 1, wherein the electrolyte is colloidal state or quasi-solid state.

5. The electrolyte as claimed in claim 1, wherein the initiator comprises an ionic compound capable of dissociating to produce nucleophilic groups, a peroxide or an azo compound capable of producing free radicals, or a primary amine compound.

6. The electrolyte as claimed in claim 5, wherein the ionic compound comprises $CH_3COOLi$, $LiOH$, $LiBF_4$, $LiPF_6$, $LiClO_4$, LiTFSI, LiFSI, $LiAsF_6$, or $LiSbF_6$.

7. The electrolyte as claimed in claim 5, wherein the peroxide comprises dibenzoyl peroxide (BPO) and the azo compound comprises azobisisobutyronitrile (AIBN).

8. The electrolyte as claimed in claim 1, wherein the lithium salt comprises $LiBF_4$, $LiPF_6$, $LiClO_4$, LiTFSI, $LiAsF_6$, $LiSbF_6$, or a combination thereof.

9. The electrolyte as claimed in claim 1, wherein the organic solvent comprises carbonate, sulfonate, nitrile, ether, ester, or fluoride.

10. The electrolyte as claimed in claim 1, further comprises an inorganic electrolyte, wherein the inorganic electrolyte comprises lithium lanthanum zirconium oxide (LLZO), tantalum doping lithium lanthanum zirconium oxide (LLZTO), lithium lanthanum titanium oxide (LLTO), lithium aluminum titanium phosphate (LATP), germanium aluminum titanium phosphate (LAGP), lithium germanium phosphorous sulfide (LGPS), or lithium tin phosphorous sulfide (LSPS).

11. The electrolyte as claimed in claim 1, wherein the weight percentage of the reactive additive is 5 wt %-50 wt %, based on the total weight of the electrolyte.

12. A lithium battery, comprising:
a positive electrode;
a negative electrode; and
an ion conductive layer, disposed between the positive electrode and the negative electrode, wherein the ion conductive layer comprises the electrolyte as claimed in claim 1.

13. The lithium battery as claimed in claim 12, wherein the material of the positive electrode comprises lithium nickel manganese oxide ($LiNi_aMn_{2-a}O_4$, $0<a<2$), lithium nickel manganese cobalt oxide ($LiNi_nMn_mCo_{1-n-m}O_2$, $0<n<1$, $0<m<1$, $n+m<1$), lithium manganate ($LiMn_2O_4$), lithium iron phosphate ($LiFePO_4$), lithium manganese oxide ($LiMnO_2$), lithium cobalt oxide ($LiCoO_2$), lithium nickel cobalt oxide ($LiNi_pCo_{1-p}O_2$, $0<p<1$), or lithium nickel manganese oxide ($LiNi_qMn_{2-q}O_4$, $0<q<2$).

14. The lithium battery as claimed in claim 12, wherein the material of the negative electrode comprises graphite, lithium titanium oxide ($Li_4Ti_5O_{12}$), or lithium.

15. The lithium battery as claimed in claim 12, further comprising a separator.

16. A composition for electrolyte, comprising:
a first solution, comprising a reactive additive and a first organic solvent, wherein the reactive additive comprises at least one amide group and at least one epoxy group; and
a second solution, comprising an initiator, a lithium salt, and a second organic solvent,
wherein the first solution and the second solution are stored separately before the first solution and the second solution are mixed to form the electrolyte.

17. The composition for electrolyte as claimed in claim 16, wherein the reactive additive has a linear structure represented by formula (I) or the reactive additive comprises a cyclic structure shown by formula (II):

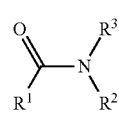

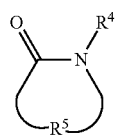

wherein each of R[1] and R[2] is independently unsubstituted or substituted epoxy group, amino group, alkyl amino group, alkyl group, alkoxy group, alkenyl group, alkenyloxy group, ether group, ester group, aryl group, or haloalkyl group; R[3] is unsubstituted or substituted epoxy group, amino group, alkyl amino group, alkyl group, alkoxy group, alkenyl group, alkenyloxy group, ether group, ester group, aryl group, haloalkyl group, or the above unsubstituted or substituted groups comprising 1-9 repeat units of amide group; and at least one of $R^1$, $R^2$, and $R^3$ comprises an epoxy group, $R^4$ is a group comprising at least one epoxy group, $R^5$ is $-(CH_2)_n-$, $-(CH_2)_n-$ with one or more $-CH_2-$ substituted by $-NR^4-$, or 1-9 repeat units of amide group

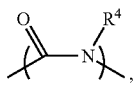

wherein n is an integer between 1 and 18.

18. The composition for electrolyte as claimed in claim 16, wherein the reactive additive comprises a cyclic structure, the cyclic structure is a 4-20 multiple-ring of unsubstituted or substituted cycloalkane, aromatic hydrocarbon, aromatic ring, heterocyclic ring, or a cyclic structure having 1-10 repeat units of amide group

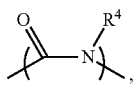

wherein $R^4$ is a group comprising at least one epoxy group.

19. The composition for electrolyte as claimed in claim 16, wherein the weight percentage of the reactive additive is 5 wt %-50 wt %, based on the total weight of the first solution and the second solution.

* * * * *